United States Patent [19]

Stieler et al.

[11] Patent Number: 5,283,754
[45] Date of Patent: Feb. 1, 1994

[54] PROCEDURE FOR MEASURING ANGLES BETWEEN REFERENCE DIRECTIONS BY MEANS OF A GYRO

[75] Inventors: Bernhard F. M. Stieler; Volker Wetzig, both of Braunschweig, Fed. Rep. of Germany

[73] Assignee: Deutsche Forschungsanstalt fur Luft- und Raumfahrt e.V., Fed. Rep. of Germany

[21] Appl. No.: 699,481

[22] Filed: May 13, 1991

[30] Foreign Application Priority Data

May 14, 1990 [DE] Fed. Rep. of Germany ....... 4015800
Jul. 9, 1990 [DE] Fed. Rep. of Germany ....... 4021793

[51] Int. Cl.$^5$ ............................................. G06F 15/20
[52] U.S. Cl. .................. 364/571.02; 33/1 N; 73/1 E; 364/559; 364/571.01
[58] Field of Search .................... 33/1 N; 73/1 E; 364/559, 571.01, 571.02, 571.05

[56] References Cited

U.S. PATENT DOCUMENTS

| | | | |
|---|---|---|---|
| 3,442,140 | 5/1969 | Pelteson | 364/571.01 X |
| 4,143,467 | 3/1979 | Erspamer et al. | 73/1 E X |
| 4,343,035 | 8/1982 | Tanner | 364/457 X |
| 4,504,146 | 3/1985 | Morgan | 356/350 |
| 4,756,088 | 7/1991 | Russell et al. | 33/312 |
| 4,799,391 | 1/1991 | Lara | 73/865.8 |

OTHER PUBLICATIONS

B. Stieler, H. Winter "Gyroscopic Instruments and Their Application to Flight Testing" AGAR-D-AG-160 vol. 15 (1982) pp. 166-184.

Primary Examiner—Edward R. Cosimano
Attorney, Agent, or Firm—Salter, Michaelson & Benson

[57] ABSTRACT

The invention relates to a procedure for measuring angles and angular characteristics, i.e. the interdependence between the angular deformations or displacements of structural parts and the acting forces or torques by means of a gyro. In the procedure the measurements can be carried out by means of a single gyro and result in a high measurement accuracy. It requires a repetitious execution of a multitude of measurements and in addition to the registration of measurement data and measurement times, the registration of reference data which are in definite connection with the angles to be measured (R-data). From the differences of the gyro measurement data and the measurement times for equal R-data the gyro measurement errors are computed and compensated accordingly.

2 Claims, 7 Drawing Sheets

PROCEDURE FOR MEASURING ANGLES BETWEEN REFERENCE DIRECTIONS BY MEANS OF A GYRO

BACKGROUND OF THE INVENTION

The invention relates to a procedure for measuring angles and angular characteristics by means of a gyro.

Measuring angles and especially angular characteristics, i.e. the interdependence between angular deformations or displacements of structural parts and acting forces or torques can be considered as a significant problem in the technical field, a problem which cannot easily be solved.

In automotive engineering deformations of the body have to be measured as a function of exterior loads. In civil engineering this is the case with angles and deformations of bridges and buildings. Also in aircraft industry the interdependence between the deformations of the fuselage and wings and the acting forces or torques has to be measured, before new models go into production. In windtunnels aerodynamic measurements with aircraft models are carried out, whereby forces and torques are measured as a function of displacement angles. Finally, in geodesy angles between reference directions have to be measured.

For the precise measurement of angles and angular characteristics measurement procedures are often being used which are difficult to handle and susceptible to trouble.

For many applications angle encoders which are advantageously used with machine tools and robots, cannot be used, as their measuring axes have to coincide with the respective accurately defined axes of rotation.

Optical measurement procedures like autocollimation require a fixed basis such as a tripod on a foundation. Also a mirror has to be fixed on the deforming part and it has to be adjusted into the optical path which it tends to leave under acting load.

Inclinometers which, in principle, are accelerometers, are easier to handle in this respect. Neither do they require a fixed basis nor a well defined axis of rotation. They measure, however, only angles with respect to the vertical and are susceptible to horizontal accelerations. This restriction often is of disadvantage.

Gyros measure angular rates with respect to an inertially fixed direction which, as it is generally known, can be defined in any direction. Due to the rotation of the earth with respect to this inertially fixed direction, the corresponding component of earth rate has to be known, if the measurement of the angular rate with respect to the earth is considered. Only after compensation of earth rate and measurement errors, i.e. gyro drift and scalefactor errors, the gyro measures the angular rates with respect to the earth with high precision, which allows also to compute angles in a computer via integration. Under these conditions gyros are easy to handle angular sensors.

In inertial navigation systems (INS) which are part of any modern aircraft, attitude and heading angles of the aircraft with respect to earth-fixed directions are obtained by means of three gyros, three accelerometers and a digital computer. But for the mere measurement of angles and angular characteristics an INS is much too costly. Besides, the sensor errors in an INS would have to be corrected for a precise implementation of this measuring task, which, at the present state of the art, is done through the use of calibration and aiding procedures.

Calibration procedures for the determination of the sensor errors are carried out before or after the measurement process, as known external references are then available, They require however a lot of time as the gyro drift is computed by means of an integration process over a period of time—its accuracy increasing with calibration time. On the other hand the achievable accuracy for measuring angles and angular characteristics is limited, if sensors are used whose drift parameters are varying with time, as the calibration procedures mentioned are based on a certain stability of these parameters in the course of the measurement procedure.

There is further known (B. Stieler, H. Winter "Gyroseopic Instruments and their Application to Flight Testing", AGARD-AG-160-VOL.15, 1982) the application of so-called aiding procedures requires the processing of known external reference data during the measurement procedure while using special mathematical algorithms (e.g. Kalman filtering). In comparison with the above-mentioned calibration procedures they can still successfully and to a larger extent be used when sensors of minor quality, i.e. with instable drift parameters are employed. The disadvantage in the application of this procedure lies, of course, in the setup of such external measurement data, which is often altogether impossible. The invention is however also a valuable supplement for the known aiding procedures.

A procedure of this kind is known for the measurement of pipelines, with the aid of the so-called pigs, which are taken along by the medium transported as separating elements between the individual charges (U.S. Pat. No. 4,799,391). Like an aircraft these pigs are equipped with an INS, with three gyros, three accelerometers and a digital computer. For the computation of the pipeline's curvature as a function of the pig's position in the pipeline the system is in addition equipped with a time basis. For the definition of position by means of an INS external measurements for INS aiding are employed such as indicators along the, pipeline, for instance magnetic anomalies in form of girth welds or similar markers.

SUMMARY OF THE INVENTION

One objective of the invention is to provide a procedure permitting to implement with a minimum of instrumentation and in a simple way by means of a gyro high precision measurements of angles and angular characteristics. For each measurement reference data are to be defined which are in definite connection with the angle to be measured (R-data).

According to the invention a procedure is provided for measuring angles or angular characteristics by means of a gyro, wherein with the aid of said gyro measurements are carried out in the reference directions concerned and at discrete intervals of time while registering reference data which are in a definite relationship with the respective angles to be measured (R-data), the measured gyro signals $a^*$ and the reference data obtained (R-data) are fed into a computer and referenced to a time basis, the measurements of the reference directions concerned are repeated the differences of times t, at which the individual measurements of equal R-data have been taken, are calculated in the computer as well as the differences of the measured gyro signals $a^*$, both as input data for the measurement equation:

$$\Delta a_i^* = a_{i2}^* - a_{i1}^*$$
$$= \hat{D}(t_{i2} - t_{i1}) + \hat{R}(t^2_{i2} - t^2_{i1})$$
$$= \hat{D}(t_{i2} - t_{i1}) + \hat{R}(t_{i2} + t_{i1})(t_{i2} - t_{i1}),$$

with
- $\hat{D}$ = optimal estimate for the unknown component of earth rate plus gyro drift, and
- $\hat{R}$ = optimal estimate for the variation with time of the unknown earth rate plus gyro drift,
- subscript i = marking of the measurement position or direction or R-data, respectively, and
- subscript 1,2 = marking of the measurement event at i, and the gyro measurement error model coefficients $\hat{D}$ and $\hat{R}$ are thereafter optimally estimated for subsequent correction of the measurement errors.

For increasing the observability of said $\hat{R}$, said time increments between the repeated measurements differ insofar that the term $(t_{i2}+t_{i1})$ should vary significantly in said measurement equation.

The method of correcting measurement errors in accordance with the invention allows to carry out measurements of high accuracy with gyros of lower quality.

BRIEF DESCRIPTION OF THE DRAWINGS

In order that the invention may be understood, the procedure according to the invention will now be described by way of examples with reference to the accompanying drawings, in which FIG. 1 schematically shows the procedure for measuring the angles $\alpha$ between the direction of the surfaces of a fixed structure.

DETAILED DESCRIPTION OF THE DRAWINGS

Figure 1:
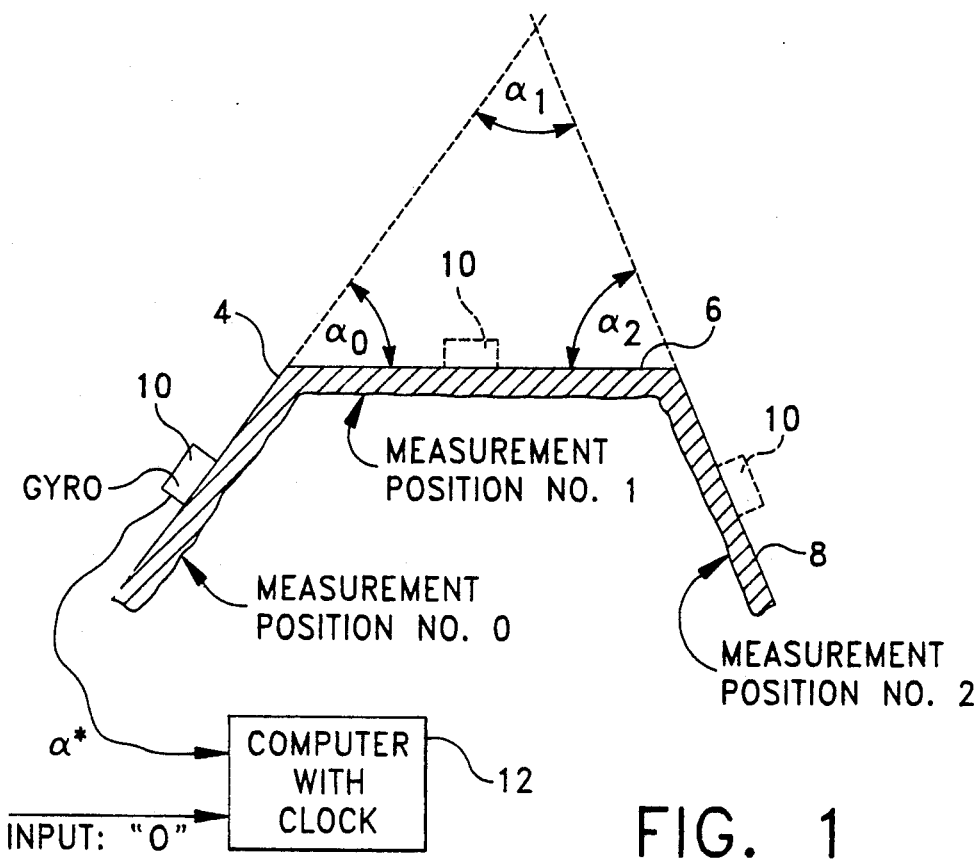

FIG. 1 shows a fixed or stationary structure 3 defined by three outer surface 4, 6 and 8, two of which include an angle $\alpha$—see angle $\alpha_0$ between surfaces 4 and 6, angle $\alpha_1$ between surfaces 4 and 8 and angle $\alpha_2$ between surfaces 6 and 8. For measuring the angles $\alpha$ between the reference surfaces 4, 6, 8 in FIG. 1 the measurement positions 0, 1, 2 have to be determined, where the gyro employed for the measurement can reproducibly be installed. The gyro 10 delivers a signal $\alpha^*$ for each measurement, which is fed to the computer 12 equipped with a time reference. For each measurement position R-data characteristic for the position concerned, are equally fed to the computer.

Figure 2:
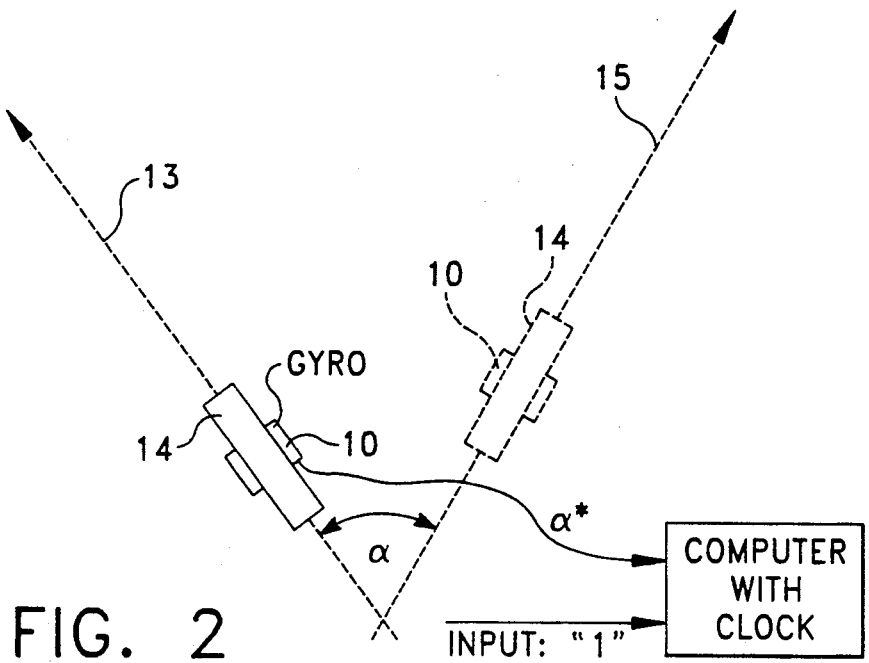
FIG. 2 schematically shows the procedure for measuring the angles $\alpha$ between reference directions.

The R-data are the manually fed in FIGS. 0, 1, 2, etc. for numbering the measurement positions or directions, whereby the, FIG. 0 indicates that the angles to be measured are referred to this position or direction (see FIGS. 1 and 2). In FIG. 2, the angle $\alpha$ between two lines of sight 13 and 15 is to be measured. The Gyro is attached to a carrier 14 which is to be positioned alternatively in the direction of the lines of sight. The R-data can, of course, also be fed into the computer automaticly by reading in of a sign or symbol, when the gyro is put into the measuring position or passes it.

Figure 3:
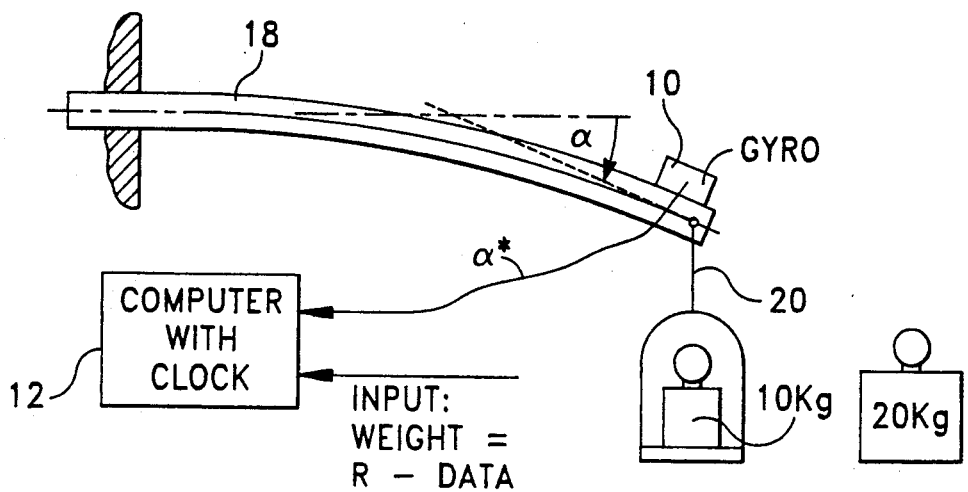
FIG. 3 schematically show the procedure for measuring the angle $\alpha$ of the structural bending of a cantilever beam as a function of the discrete load F of a weight.
Figure 4:
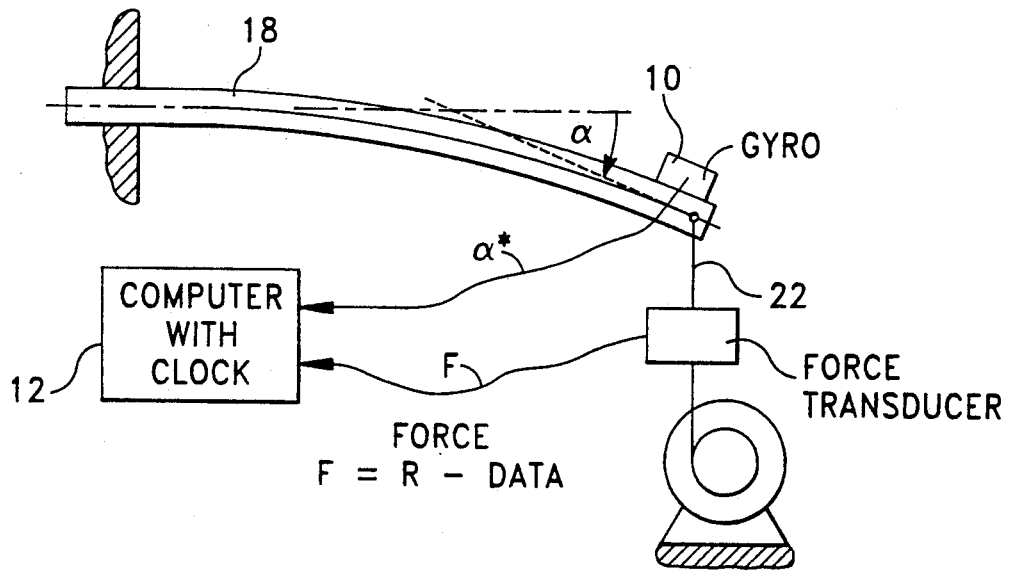
FIG. 4 schematically shows the procedure for measuring the angle $\alpha$ of the structural bending of a cantilever beam as a function of the continuously varying load F.

In the case of the application presented in FIGS. 3 and 4 for the measurement of bending or torsion characteristics of a cantilever beam structure 18 in the form of the respective dependence of the deformation angle $\alpha$ as a function of the weight 20 (see FIG. 3) or the continuously varying force F 22 (see FIG. 4) applied to the cantilever beam 18, the gyro is mounted stationarily to it. In both cases the force is selected as R-data.

Figure 6:
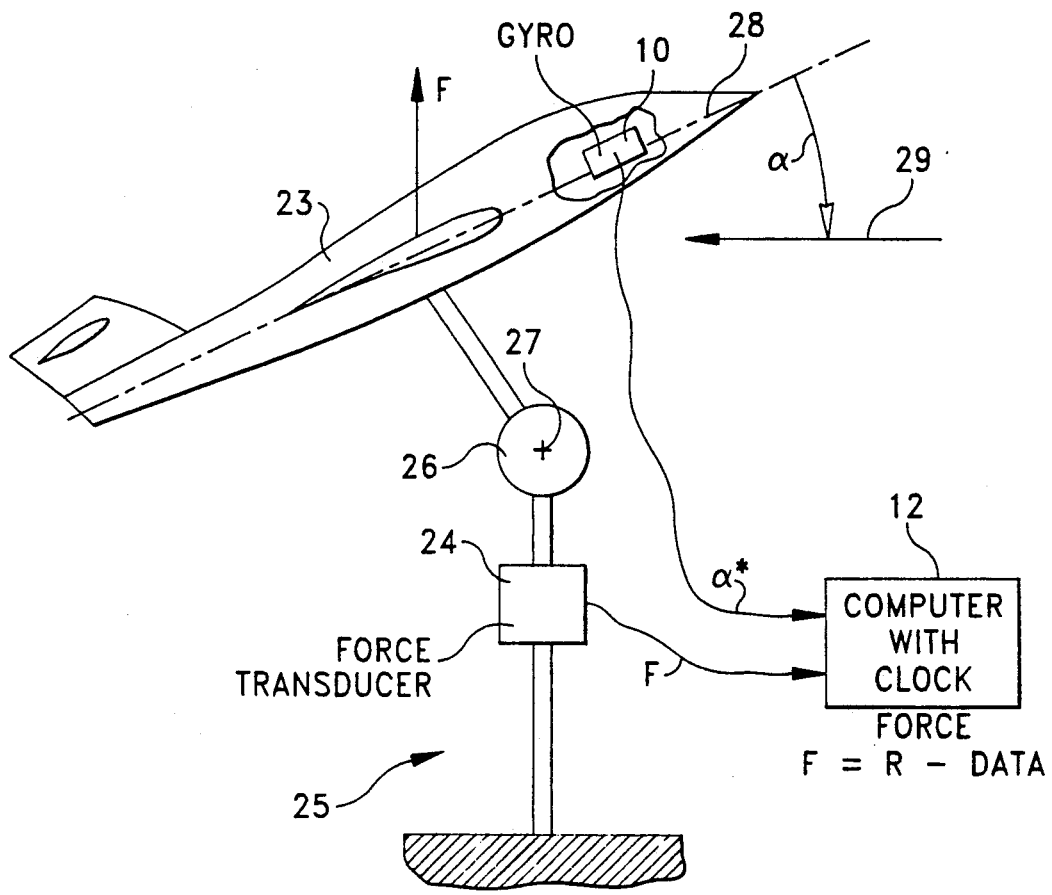
FIG. 6 schematically shows the procedure for aerodynamic measurements under varying angles of attack.

The setup in FIG. 6 indicates how aerodynamic measurements are taken, i.e. the dependence of the lift force F as a function of the angle of attack $\alpha$. Again the force is selected as the R-data.

The model of an airplane 23 is fixed to a support 25 including an adjustable joint 26 with a turning axis 27 and a force transducer 24. The gyro 10 is attached to the model on a reference axis 28. FIG. 6 further shows the air flow direction 29. The angle to be measured is the angle of attack $\alpha$ which is the angle between the two directions 28 and 29. By means of the force transducer 24, the lift force F is measured. The gyro readings $\alpha^*$ and the force F are fed to the computer 12.

It is assumed that in all cases shown in FIGS. 1 to 4 and 6 the repeated measurements taken under stationary external conditions with equal R-data are treated in the computer as being taken at equal angles, which opens the possibility of calculating the gyro errors due to unknown earth rate component and gyro drift described bellow, and of subsequent correction thereafter. This makes all the difference in the application of the above-mentioned aiding procedures. For an increase in the measurement accuracy the procedure for the measurement of angles and angular characteristics does not require any known external references during the measurement process, but only information on the equality of R-data.

The angle $\alpha^*$ resulting from the integration of the gyro raw data shall be called gyro reading in the sequel.

Due to the effects of unknown earth rate component and gyro drift the gyro reading $\alpha^*$ cannot be used as a reference for the angle $\alpha$ or the angular characteristics $F(\alpha)$, since the error angle $\epsilon$ is superposed to it:

$$\alpha^* = \alpha + \epsilon. \tag{1}$$

$\epsilon$, as the result of an integration process, changes with time and complies with the following relationship, for instance (see FIGS. 7 and 8, middle diagram, respectively):

$$\epsilon(t) = D\,t + R\,t^2 + \int w\,dt, \tag{2}$$

with D being unknown earth rate component plus gyro drift, R being change of D with respect to time and w being stochastic drift whose integral to the angular level is instationary and known as random walk, for instance.

Figure 7:
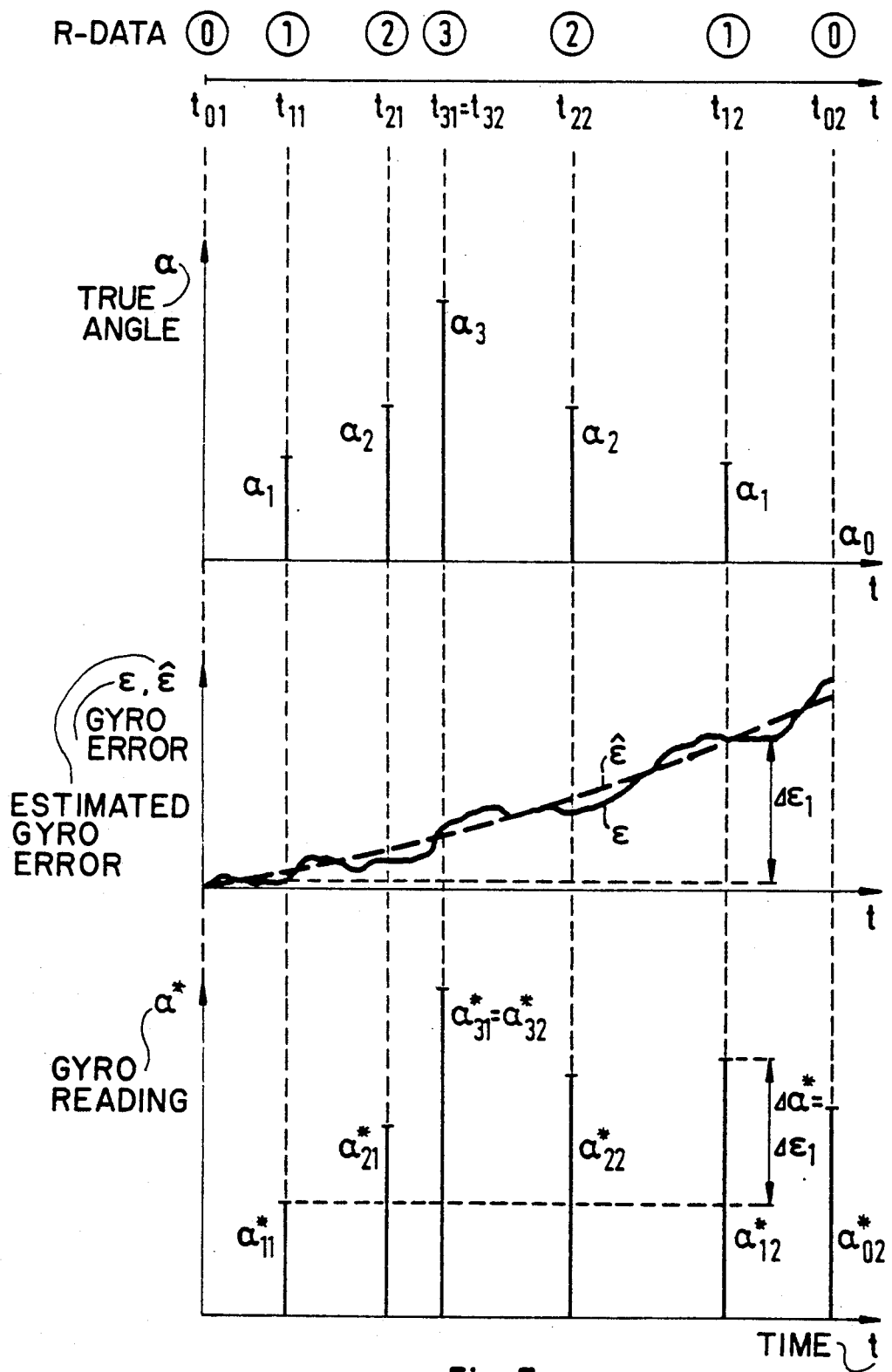
FIG. 7 at the top border shows for angular measurements as illustrated in FIG. 1 the number of the measurement position or of the reference data; in the lower diagram portion shows the gyro readings $\alpha^*$ between the different measurement positions with the difference $\blacktriangle \alpha^*$ for $\alpha^*_{12}$; in the middle diagram portion shows the actual gyro error $\epsilon$ and the estimated gyro error $\hat{\epsilon}$ with the gyro error $\blacktriangle \epsilon_1$ for $\alpha^*_{12}$; and in the upper portion of the diagram shows the trus angle to be measured.
Figure 8:
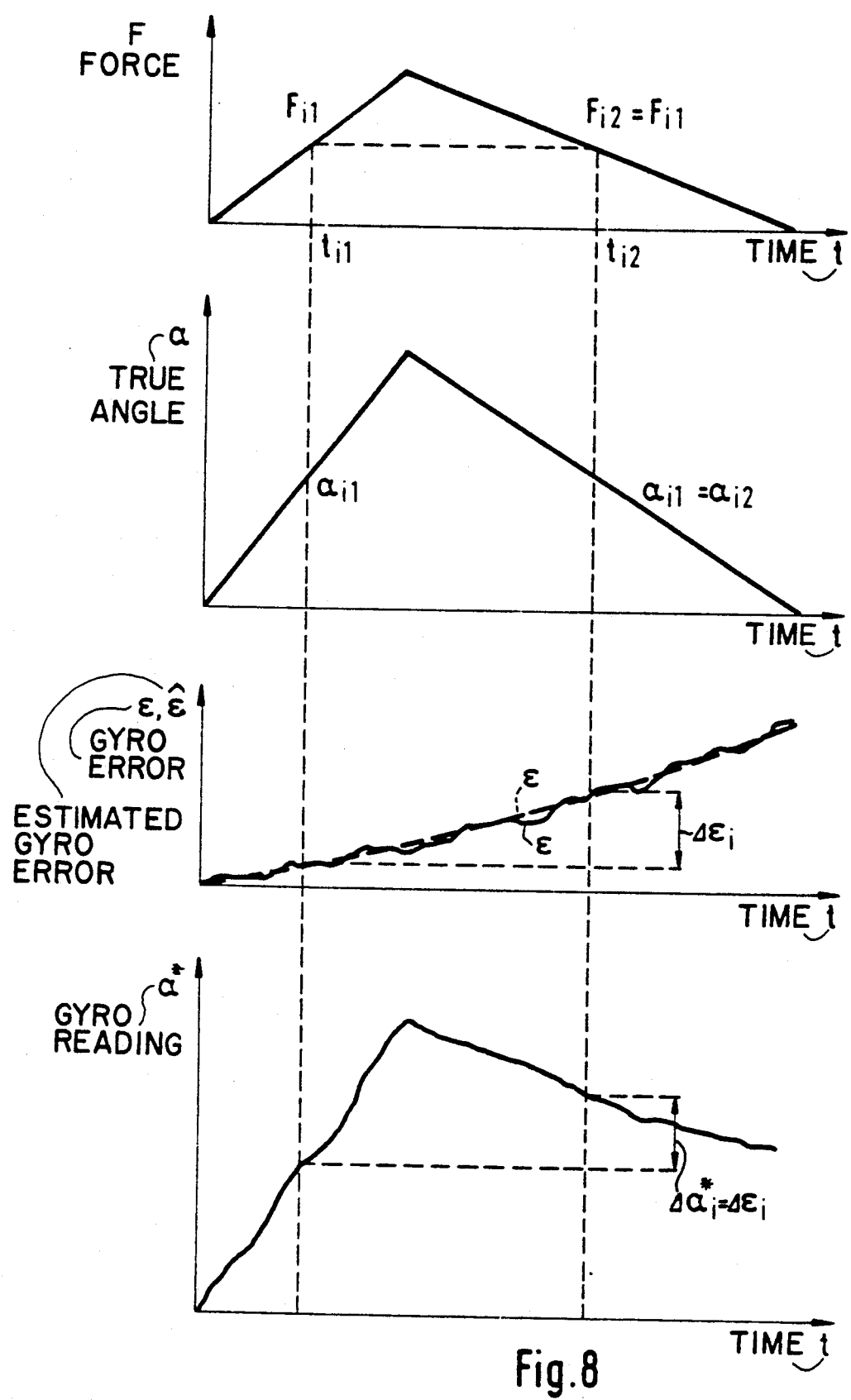
FIG. 8 shows for angular characteristic measurements as illustrated in FIG. 4; in the upper diagram a force F to be used as R-data; in the lower diagram the gyro readings $\alpha^*$ including the difference $\blacktriangle \alpha^*i$; in the lower middle diagram the gyro error $\epsilon$ and the estimated gyro error $\hat{\epsilon}$; and in the upper middle diagram, the true angle to be measured.

The functioning of the procedure for measuring angles and angular characteristics is based on the already mentioned definite interdependence between the R-data and the angles to be measured. It is the basis for optimally estimating the gyro error through the function:

$$\hat{\epsilon}(t) = \hat{D}t + \hat{R}t^2 \tag{3}$$

and correcting the gyro readings $\alpha^*$ accordingly. In FIGS. 7 and 8 (middle) $\epsilon(t)$ is marked as a dotted line.

Eq. (3) does not contain the stochastic gyro measurement error due to w. It cannot be estimated and its contribution affects the coefficients $\hat{D}$ and $\hat{R}$.

The computational process starts from the assumption that the gyro scale factor is known with sufficient accuracy or that it is calibrated according to the procedure described below.

The measurement program itself is quite essential for data processing in the computer. It has to be layed out in a way that on the one hand with the use of a single gyro rotations take place about one axis only; in other words, the angles to be measured lie in one earth fixed reference plane only and the sensitive gyro axis stays parallel to the vertical to this plane—at least within certain limits. On the other hand the measurement program requires also that measurements with equal R-data have to be repeated at least twice, whereby the conditions mentioned below for the time differences of such measurements have to be taken into account.

The measurement procedure and the computational process shall now be discussed in more detail by taking the measurement of angles as an example. When the angles $\alpha_1$, $\alpha_2$, $\alpha_3$ between the measurement positions or directions 0 and 1, 0 and 2, 0 and 3 (see FIGS. 1 and 2) are to be measured, the gyro is brought into the positions or directions: 0, 1, 2, 3, 2, 1, 0 or O, 3, 2, 1, 3, 2, O (see FIG. 7, top). The signals to be registered or computed in the computer are:

the time $t_{ij}$ (with i=measurement position or direction and j=measurement sequence at i, i.e. j=1 or 2 in the example above), the R-data, i.e. the figures i=0, 1, 2, 3, 2, 1, 0 and the gyro readings $\alpha^*ij$ (with $\alpha^*01 = 0$).

Figure 9:
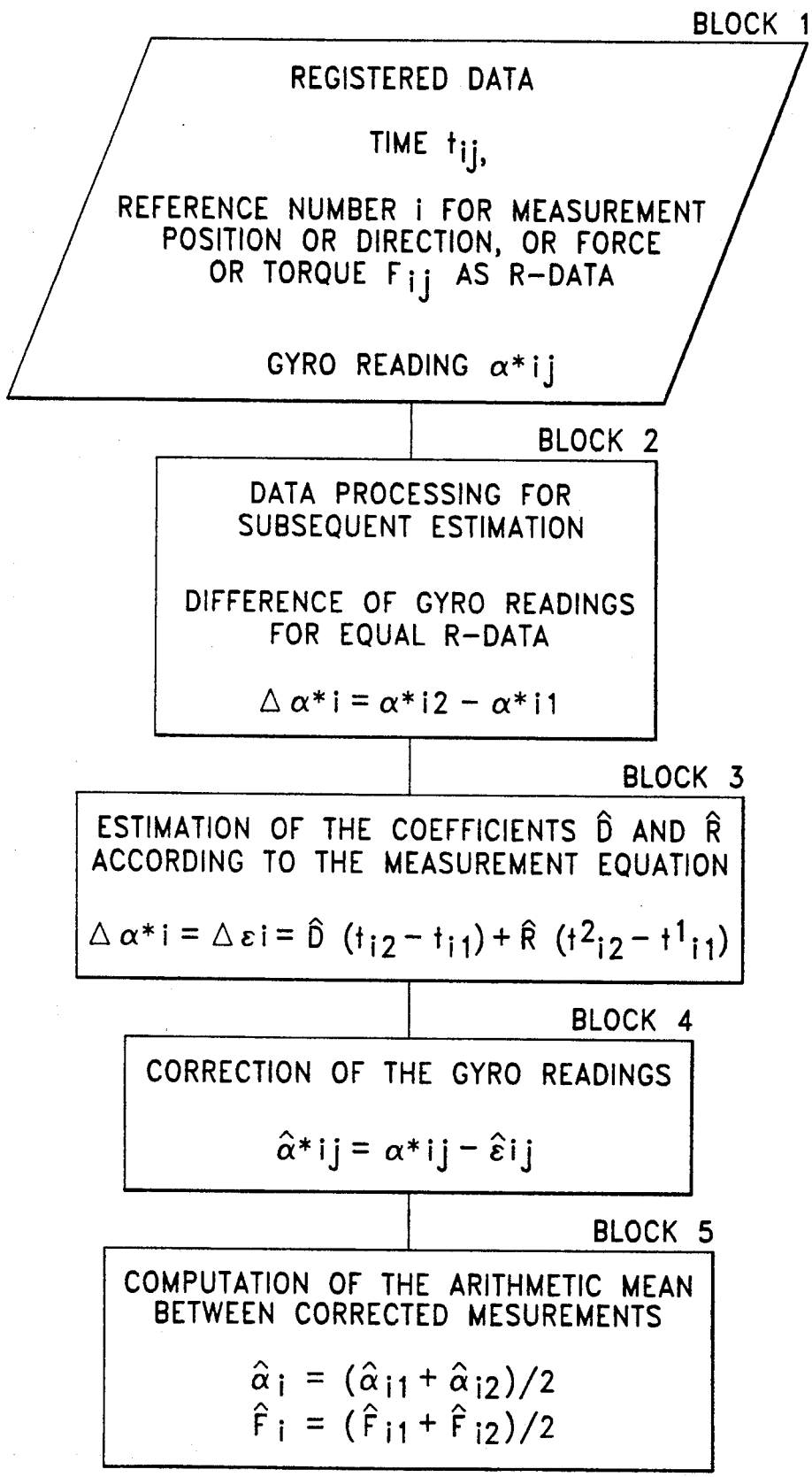
FIG. 9 shows the flow diagram of the computational process for correcting the gyro readings.

This data registration is shown as block 1 in the flow diagram for the computation process in FIG. 9. The next computational step is the forming of differences between pairs of gyro readings for equal R-data i in the example above (see FIG. 9, Block 2):

$$\begin{aligned}\Delta\alpha_i^* &= \alpha_{i2}^* - \alpha_{i1}^* = [\alpha_{i2} - \epsilon_{i2} - (\alpha_{i1} + \epsilon_{i1})] \\ &= \epsilon_{i2} - \epsilon_{i1} = \Delta\epsilon_i\end{aligned} \tag{4}$$

For illustration, see FIGS. 7 and 8. The explanation for the result on the right hand side has to be seen in the fact that for measurements in the same positions or directions the angles to be measured must be identical ($\alpha_{i2} = \alpha_{i1}$). The difference in gyro readings during the time difference $t_{i2} - t_{i1}$ between both measurements has increased by the difference in gyro reading errors $\Delta\epsilon_i$. According to Eq. (3) the measurement equation for the estimating process is thus:

$$\Delta\alpha^*i = \hat{D}(t_{i2} - t_{i1}) + \hat{R}(t^2_{i2} - t^2_{i1}), \tag{5}$$

or as matrix-vector equation:

$$\Delta\alpha^*i = \underline{H}i\underline{x} \tag{6}$$

with $$\underline{H}i = [(t_{i2} - t_{i1})\ (t^2_{i2} - t^2_{i1})] \tag{7}$$

and $$\underline{x} = (\hat{D}\ \hat{R})T \tag{8}$$

After forming all differences for measurements with equal R-data the unknown coefficients $\hat{D}$ and $\hat{R}$ are computed, using known algorithms (regression, for instance). $\hat{D}$ contains the unknown component of earth rate plus gyro drift and $\hat{R}$ their time variation. This is indicated in Block 3 of the flow diagram in FIG. 9. Using Eq. (3), the correction of the gyro readings is now possible at any measurement time (FIG. 9, Block 4).

It is comprehensible that the coefficients $\hat{D}$ and $\hat{R}$ should be evaluated on the basis of all possible differences $\Delta\alpha^*i$. The evaluation procedure for those coefficients works also, if, due to unfavorable measuring conditions certain differences are left out—at measuring position 10, for instance (i=10). With the estimated coefficients the later correction of the left out measurements $\alpha^*10,1$ and $\alpha^*10,2$ remains possible in accordance with Eq. (3).

As there are at least two measurement values at hand for each measurement position or direction after their correction, a further increase in the measurement accuracy can be obtained by averaging measurements for equal positions or directions (FIG. 9, Block 5).

Figure 5:
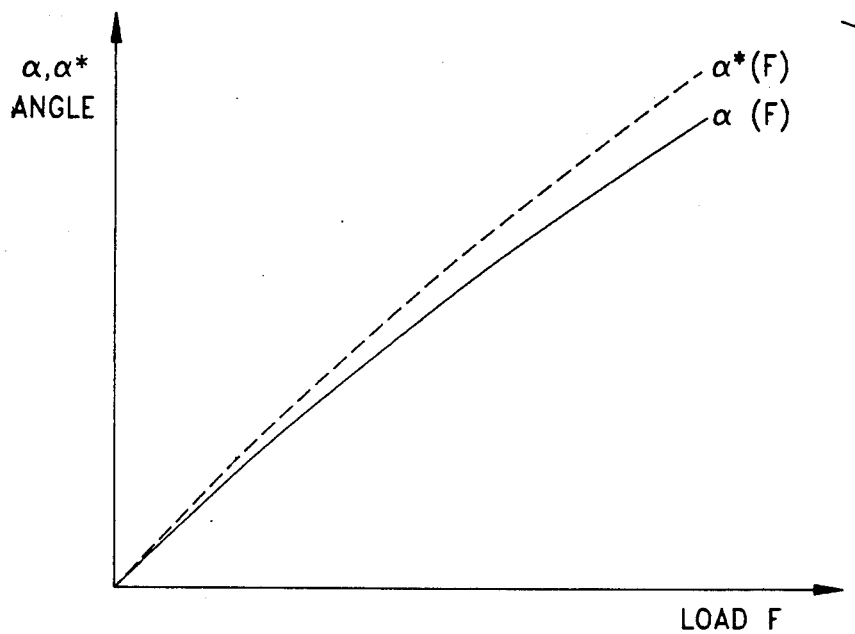
FIG. 5 schematically shows the angular characteristics $\alpha$ (F) of the deformation of a structure under varying load F plotted with respect to the true deformation angle $\alpha$ and the gyro reading $\alpha^*$ in the upper diagram; and in the lower diagram the angular characteristic $F(\alpha)$ of the lifting forces acting on an aerodynamic structure plotted with respect to the true angles of attack $\alpha$ and the gyro readings $\alpha^*$.
Figure 5:
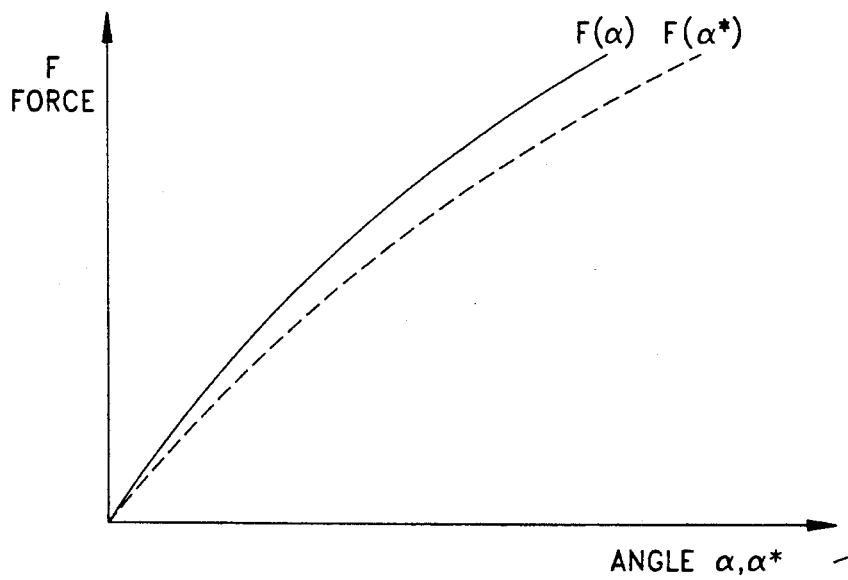

The next example deals with the measurement procedure and computational process for angular characteristics. As mentioned in the beginning, it means the measurement of the interdependence between the angular deformation of structures and the external forces or torques (see FIGS. 3 to 5); for aerodynamic measurements it means the determination of the interdependence between the aerodynamic forces or torques acting on the aircraft model in a windtunnel, for instance, and their angles of attack (see FIGS. 6 and 5).

The angle measuring procedure described above can also be used for this application without major changes. The computer now only has to be fed with the information to use the forces or torques as R-data. Since the evaluation procedure of the gyro readings described above is based on repeated measurements with equal R-data, the measurement program consists of a positive force or torque variation going up to a maximum value followed by a reverse variation back to the initial value (see FIGS. 3, 4 and 8). It is proceeded correspondingly for aerodynamic measurements—instead of the forces or torques the angles of attack are varied (see FIGS. 6 and 8).

If the forces or torques are not yet fed to the computer as digital signals, but are applied in a discrete manner, their values have to be read in manually or equal figures for equal values have to be put in instead (see FIGS. 3 and 7).

The search for matching measurements, i.e. repeated measurements with equal forces or torques as R-data, is particularly easy in the latter case (discrete input of forces or torques). If the forces or torques or the angles of attack are varied continuously during windtunnel measurements, the computer has to find matching measurements, i.e. measurements of equal R- data, within positive and negative variations, by interpolation. Again it is, of course, possible to leave out certain measurement ranges for the estimation of the coefficients $\hat{D}$ and $\hat{R}$, but to include those ranges in the subsequent correction.

In the model for the gyro reading error the coefficient $\hat{R}$ for the variation of $\hat{D}$ with respect to time enters the measuring Eq. (5) for the regression via the difference of the square of the measuring time as variable; one may put for it:

$$t^2_{i2} - t^2_{i1} = (t_{i2} + t_{i1})(t_{i2} - t_{i1}), \qquad (9)$$

i.e. it is the product of twice the arithmetic mean and the difference of the measuring times. But the latter is also the variable of the coefficient $\hat{D}$ in the measuring Equation (5). Since from the standpoint of observability the variables of $\hat{D}$ and $\hat{R}$ have to vary significantly for different measurements of equal R- data, the corresponding arithmetic mean $(t_{i2} + t_{i1})/2$ of measurement times with equal R-data has to vary. According to FIGS. 7 and 8 this can be obtained effectively by observing the following condition with respect to time. The time differences between measurements in the range of positive variations has to be distinctly different from the ones in the range of negative variations, by the factor 2, for instance. If the variations are carried out continuously, the positive speed of variation has to be higher by the factor 2 with respect to the negative, or vice versa.

In the description above it is started from the assumption that the gyro scale factor is known with sufficient accuracy. Specification values for gyros in the order of magnitude of $10^{-3}$ for their relative stability are nowadays guaranteed by the manufacturers. If this value is insufficient, the instrument for the measurement of the angles or angular characteristics has to be calibrated prior to its use. This is not difficult at all, since the scale factor can be calibrated easily by measuring a known angle. In field application the angle of 360 degrees can be obtained with the help of an even plane with stops.

The procedure of scale factor calibration makes use of the angle measuring procedure described above. The computer is switched into this mode via the keyboard. The gyro to be calibrated is put onto the plane with its sensitive axis perpendicular and against the stop. As reference the FIG. 0 is fed into the computer manually. The gyro is subsequently turned by 360 degrees on the plane and put against the stop again, after which the FIG. 1 is fed manually into the computer as R-data. Subsequent measurements after 360 degrees rotations in opposite sense are marked with successive figures. In the then following evaluation procedure the computer finds estimates for the gyro reading errors due to earth rate component and gyro drift as a function of time using the fact that the effect of a constant scale factor error is reduced to zero after a positive and a negative 360-degree turn. The differences in measurements with even and with odd figures as R-data contain the time dependent gyro reading error $\epsilon(t)$ only. After estimating its course $\hat{\epsilon}(t)$ and its correction, the corrected gyro readings should indicate plus or minus 360 degrees after each rotation. The difference is used to gyro scale factor computation and correction.

We claim:
1. A method for measuring an angle between first and second reference directions in a predetermined plane by means of a single gyro comprising the steps of:
    moving said gyro from a first measurement position in said first reference direction to a second measurement position in said second reference direction, said gyro continuously outputting a gyro signal $\alpha^*$;
    continuously registering said gyro signal;
    registering reference data at said first and second measurement positions, said reference data having a predetermined relationship with the reference direction to be measured;
    registering a time t at which said reference data are registered;
    repeating at least once for each of said first and second reference directions, the prior steps of registering reference data and registering a time t at which said reference data are registered;
    calculating for each of two equal reference data, a difference of said registered times t at which the reference data are registered, and a difference of said registered gyro signal $\alpha^*$ at which the reference data are registered, said time difference and said gyro difference being used as input for a measurement equation comprising:

$$\begin{aligned}\Delta \alpha_i^* &= \alpha_{i2}^* - \alpha_{i1}^* \\ &= \hat{D}(t_{i2} - t_{i1}) + \hat{R}(t^2_{i2} - t^2_{i1}) \\ &= \hat{D}(t_{i2} - t_{i1}) + \hat{R}(t_{i2} + t_{i1})(t_{i2} - t_{i1})\end{aligned}$$

wherein
$\hat{D}$ = optimal estimate for an unknown component of earth rate plus gyro drift, and
$\hat{R}$ = optimal estimate for a variation with time of the unknown earth rate plus gyro drift,
subscript i = marking of the measurement position or reference direction, or reference data, respectively, and
subscript 1,2 = marking of a measurement event at i;
    optimally estimating said gyro measurement error model coefficients $\hat{D}$ and $\hat{R}$; and
    correcting said registered gyro reading accordingly thereby producing a measurement of said angle between said first and second reference directions.
2. The method of claim 1 further comprising the steps of:
    carrying out further repeated measurements with equal reference data for the observability of $\hat{R}$, wherein time increments of time intervals differ in such a way that the term $(t_{i2} + t_{i1})$ varies significantly in said measurement equation.

* * * * *